(12) United States Patent
Kang et al.

(10) Patent No.: US 10,890,747 B2
(45) Date of Patent: Jan. 12, 2021

(54) MAGNIFYING OBSERVATION APPARATUS

(71) Applicant: Keyence Corporation, Osaka (JP)

(72) Inventors: Woobum Kang, Osaka (JP); Hayato Ohba, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/595,551

(22) Filed: Oct. 8, 2019

(65) Prior Publication Data

US 2020/0174240 A1 Jun. 4, 2020

(30) Foreign Application Priority Data

Nov. 29, 2018 (JP) .................................. 2018-223947

(51) Int. Cl.
*G02B 21/06* (2006.01)
*G02B 21/36* (2006.01)
*G02B 21/02* (2006.01)

(52) U.S. Cl.
CPC ........... *G02B 21/06* (2013.01); *G02B 21/365* (2013.01); *G02B 21/368* (2013.01); *G02B 21/02* (2013.01)

(58) Field of Classification Search
None
See application file for complete search history.

(56) References Cited

U.S. PATENT DOCUMENTS

| | | | |
|---|---|---|---|
| 2010/0053319 A1* | 3/2010 | Sakai | G06T 7/001 348/125 |
| 2015/0116477 A1* | 4/2015 | Kang | G02B 21/365 348/79 |
| 2015/0241680 A1* | 8/2015 | Oba | G02B 21/367 348/79 |
| 2018/0024346 A1 | 1/2018 | Inomata et al. | |
| 2019/0162945 A1* | 5/2019 | Hua | H04N 5/2353 |

OTHER PUBLICATIONS

U.S. Appl. No. 16/525,637, filed Jul. 30, 2019 (172 pages).
U.S. Appl. No. 16/525,639, filed Jul. 30, 2019 (175 pages).

\* cited by examiner

*Primary Examiner* — Heather R Jones
(74) *Attorney, Agent, or Firm* — Kilyk & Bowersox, P.L.L.C.

(57) ABSTRACT

A magnifying observation apparatus obtains a plurality of first luminance images by controlling an illumination section so as to illuminate an observation target with illumination light from a first illumination direction and controlling a change section and an imaging section so as to image the observation target, obtains a plurality of second luminance images by controlling the illumination section so as to illuminate the observation target with illumination light from a second illumination direction symmetric with the first illumination direction about an optical axis and controlling the change section and the imaging section so as to image the observation target in a plurality of different focal positions, and generates a roughness enhancement image that enhances roughness on the surface of the observation target by applying depth synthesis and roughness enhancement.

20 Claims, 6 Drawing Sheets

FIG. 6C

MAGNIFYING OBSERVATION APPARATUS

CROSS-REFERENCE TO RELATED APPLICATIONS

The present application claims foreign priority based on Japanese Patent Application No. 2018-223947, filed Nov. 29, 2018, the contents of which is incorporated herein by reference.

BACKGROUND OF THE INVENTION

1. Field of the Invention

The present invention relates to a magnifying observation apparatus.

2. Description of Related Art

Generally, optical systems having high optical performance are required for microscopes to observe an observation target with high precision. In addition, microscopes that display an observation image on a display device in real time have been developed and competition to display an observation target accurately and minutely as it is has been made among microscope manufacturers.

On the other hand, the performance of image processing chips has been improved so that they can be adopted for microscopes. In addition, microscopes are now used by inspectors who inspect (magnifying-observes) products manufactured in factories as well as researchers in biology.

Accordingly, market needs for microscopes that differ from conventional ones aspiring to pursue high optical performance have been developed. Such microscopes are often referred to as magnifying observation apparatuses to distinguish from conventional microscopes (see JP-A-2018-013734).

SUMMARY OF THE INVENTION

By the way, there are needs to observe roughness on the surfaces of products manufactured in factories. The problem here is the depth of field of a lens. When the difference in height of roughness exceeds the depth of field, the roughness becomes blurred and the user cannot recognize the roughness accurately. Accordingly, an object of the invention is to provide a roughness enhancement image produced through depth synthesis.

The invention provides a magnifying observation apparatus including, for example, an optical system that includes an objective lens and an imaging lens; an illumination section that illuminates, from different directions, an observation target placed in a visual field of the optical system with illumination light; an imaging section that receives light from the observation target via the optical system and generates a luminance image of the observation target; a change section that changes a focal position of the optical system along an optical axis of the optical system; a control section that controls the illumination section, the imaging section, and the change section; and a display section that displays an observation image that is an image of the observation target, in which the control section has an image generating section that obtains a plurality of first luminance images by controlling the illumination section so as to illuminate the observation target with the illumination light from a first illumination direction and controlling the change section and the imaging section so as to image the observation target in a plurality of different focal positions, obtains a plurality of second luminance images by controlling the illumination section so as to illuminate the observation target with the illumination light from a second illumination direction symmetric with the first illumination direction about the optical axis and controlling the change section and the imaging section so as to image the observation target in a plurality of different focal positions, and generates a roughness enhancement image that enhances roughness on a surface of the observation target by applying depth synthesis and roughness enhancement to the plurality of first luminance images and the plurality of second luminance images and has a depth of field wider than a single luminance image obtainable by the imaging section and in which the display section displays the roughness enhancement image as the observation image.

According to the invention, there is provided a roughness enhancement image produced through depth synthesis.

BRIEF DESCRIPTION OF THE DRAWINGS

FIG. 2 illustrates a control section and the like;

DESCRIPTION OF EMBODIMENTS

<Magnifying Observation Apparatus>

Figure 1:
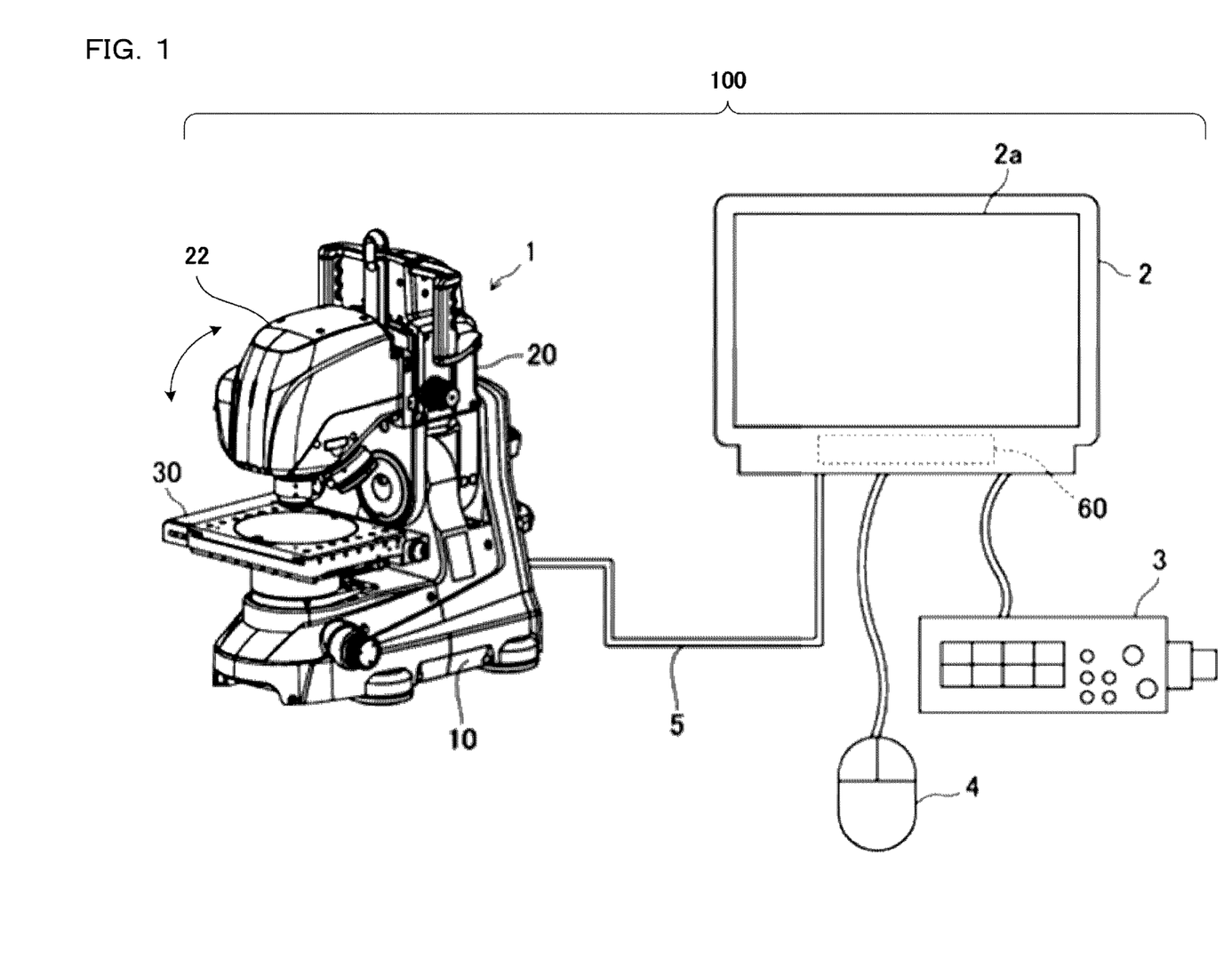
FIG. 1 schematically illustrates a magnifying observation apparatus 100.

FIG. 1 illustrates a magnifying observation apparatus 100. The magnifying observation apparatus 100 magnifies and displays, for example, a specimen such as a small object, an electronic component, or a workpiece to be machined (referred to below as an observation target). The user can inspect the external appearance and measure dimensions of the observation target using the magnifying observation apparatus 100. The magnifying observation apparatus 100 may be also referred to as a microscope or a digital microscope. An observation target is not limited to the above example and may be any object.

An observation section 1 has a base section 10, a stand section 20, a head section 22, and a placement table 30. The base section 10 is used to place the observation section 1 on a desk or the like without shaking the observation section 1 and forms substantially a lower half of the observation section 1. The base section 10 is provided with the placement table 30. The placement table 30 is supported by the portion of the base section extending from the vicinity of middle portion in the front-rear direction to the front, and projects upward from the base section 10. The placement table 30 is a portion on which the observation target is placed and is formed as an electric placement table in the embodiment. That is, the observation target can be supported movably in both a width direction (X-direction) and a depth direction (Y-direction) of the electric placement table and rotatable about an up-down direction (Z-direction) and Z-axis. The stand section 20 is swingable with respect to the base section 10. For example, the stand section 20 is swingable clockwise or counterclockwise when the observation section 1 is seen from the front. When the stand section 20 swings, the head section 22 also swings. The stand section 20 and the head section 22 are attached movably in the Z-axis direction. The head section 22 has an objective lens, an imaging lens, an illumination apparatus, an imaging element, and the like. The head section 22 illuminates the observation target placed on the placement table 30 with illumination light, detects the received amount of the reflected light or transmitted light of the illumination light from the observation target, and generates an image of the observation target. It should be noted here that details on the structure and the function of the observation section 1 are disclosed in Japanese Patent Application No. 2018-161347 described by the same applicant as this specification. The entire contents of the disclosure are incorporated herein by reference as apart of this specification.

A display section 2 has a display screen 2a enabling color display such as, for example, a liquid crystal display panel or an organic EL panel and receives electric power from the outside. The display screen 2a may have a built-in touch operation panel (an example of a reception section). Although a control section 60 is built into a display section 2 as an example in the embodiment, the present invention is not limited to the embodiment and the control section 60 may be built into the observation section 1 or a console section 3, or the control section 60 may be an external unit separated from the display section 2, the observation section 1, and the console section 3. The display section 2 is connected to the observation section 1 via a cable 5 so that signals can be received or transmitted. Supply of electric power to the observation section 1 may be performed via the cable 5 or a power supply cable (not illustrated).

The console section 3 is connected to the control section 60. Unlike a general keyboard or mouse, the console section 3 is a special operation device capable of operating the observation section 1, inputting or selecting various types of information, selecting an image, specifying a region, or specifying a position. A mouse 4 as a pointing device is connected to the control section 60. The console section 3 and the mouse 4 may be replaced with, for example, a touch panel input device, an audio input device, or the like as long as the magnifying observation apparatus 100 can be operated. A touch panel input device may be integrated with the display section 2 and may be configured to detect an arbitrary position on the display screen displayed on the display section 2. The console section 3 and the mouse 4 are reception sections that receive an input of an arbitrary position specified by the user in an image displayed on the display section 2.

An apparatus for performing operation and control, a printer, a computer for performing various other processes, a storage device, a peripheral device, and the like can be connected to the magnifying observation apparatus 100 in addition to the apparatuses and devices described above. The connection used here may be a serial connection such as, for example, IEEE1394, RS-232x, RS-422, or USB, a parallel connection, or an electric, magnetic, or optical connection via a network such as 10BASE-T, 100BASE-TX, or 1000BASE-T. In addition to a wired connection, a wireless connection using a wireless LAN such as IEEE802.x, radio waves such as Bluetooth (registered trademark), an infrared ray, or optical communication may be used. In addition, for example, various memory cards, a magnetic disk, a magneto-optical disk, a semiconductor memory, a hard disk, or the like can be used as a storage medium used as a storage device for data exchange or storage of various settings. The magnifying observation apparatus 100 can be a magnifying observation system in which various units, apparatuses, devices described above are combined with each other.

<Control Section>

Figure 2:
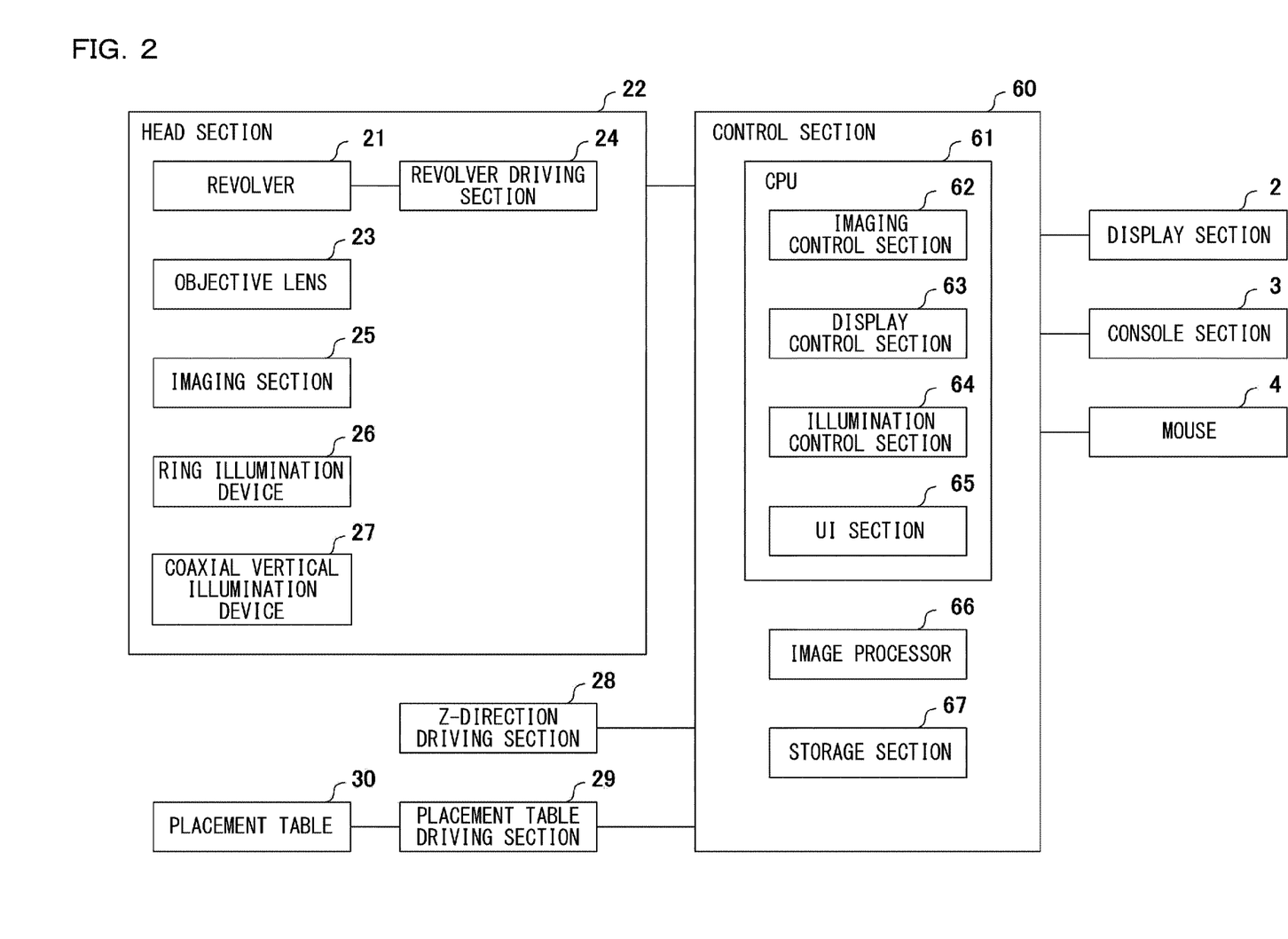

As illustrated in FIG. 2, the control section 60 includes a CPU 61, an image processor 66, a storage section 67, and the like. The CPU 61 achieves various functions by executing programs stored in a ROM region of the storage section 67. An imaging control section 62 controls a revolver driving section 24 to rotate a revolver 21 provided in the head section 22. This changes the magnification of an objective lens 23. That is, the objective lens 23 with a certain magnification is switched to the objective lens 23 with another magnification. The imaging control section 62 controls a Z-direction driving section 28 that moves the head section 22 up or down to change the focal position of the objective lens 23. The imaging control section 62 moves the placement table 30 in the X-direction, the Y-direction, and the Z-direction or rotates the placement table 30 in a θ direction via a placement table driving section 29. The imaging control section 62 controls an imaging section 25 provided in the head section 22, causes the imaging section 25 to image an observation target W, and obtains an image of the observation target W. A display control section 63 displays an image of the observation target W and the like on the display section 2. An illumination control section 64 controls the turning on and off of a ring illumination device 26 and a coaxial vertical illumination device 27 provided in the head section 22. An UI section 65 displays a UI (user interface) on the display section 2 via the display control section 63 or receives a user instruction input through the console section 3 or the mouse 4. The image processor 66 creates various types of image data from an image signal obtained by the imaging section 25. The image processor 66 may be achieved by the CPU 61. The storage section 67 has the ROM region, a RAM region, a memory card, and the like.

<Image Processor>

Figure 3:
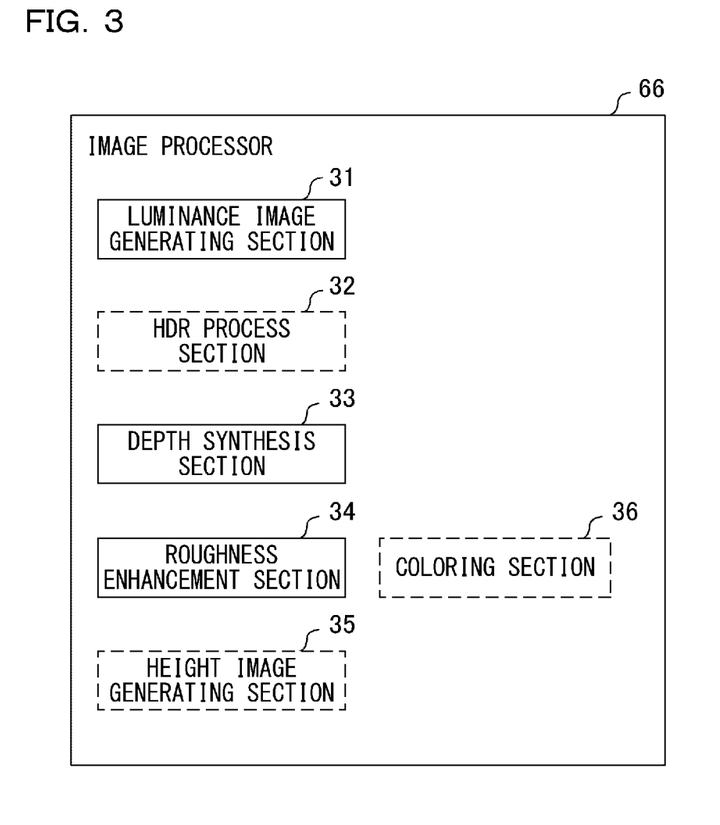
FIG. 3 illustrates an image processor.

As illustrated in FIG. 3, the luminance image generating section 31 in the image processor 66 creates a luminance image based on the image signal obtained by the imaging section 25 via the imaging control section 62. An HDR process section 32 obtains a plurality of luminance sub-images having different exposure times by controlling the imaging section 25 via the imaging control section 62 and generates a luminance image by applying an HDR process to the plurality of luminance sub-images. HDR is an abbreviation for high dynamic range. A depth synthesis section 33 obtains the plurality of luminance sub-images having different focal positions by controlling the imaging section 25 via the imaging control section 62 and generates a depth combined image by applying depth synthesis to the plurality of luminance sub-images. It should be noted here that the luminance sub-image may be a luminance image subjected to an HDR process. A roughness enhancement section 34 creates a roughness enhancement image in which the roughness on the surface of the observation target W is enhanced by synthesizing the first luminance images of the observation target W illuminated from a first illumination direction and the second luminance images of the observation target W illuminated from a second illumination direction. The first illumination direction and the second illumination direction are symmetric with each other about an optical axis A1. It should be noted here that the first luminance images and the second luminance images may be depth combined images produced through depth synthesis. For example, the roughness enhancement section 34 may generate the roughness enhancement image based on the difference in luminance between the first depth combined image and the second depth combined image. Based on a luminance value i1 of a pixel (x coordinate, y coordinate) in the first depth combined image and a luminance value i2 of a pixel (x coordinate, y coordinate) in the second depth combined image, a pixel value Ixy of a pixel (x coordinate, y coordinate) in the roughness enhancement image may be calculated by the following expression (1).

$$Ixy=(i1-i2)/(i1+i2) \quad (1)$$

The pixel value of the roughness enhancement image is obtained by dividing the difference between a pair of pixel values by the sum of the pair of pixel values. When the difference between the pixel values is normalized, an expression other than expression (1) may be adopted.

The difference between the luminance value i2 and the luminance value i1, which is the numerator of the expression (1), reflects the inclination (gradient) of a local position of the observation target W corresponding to the pixel. The roughness is enhanced by the inclination of the plane of the observation target W.

The absolute value of a luminance value depends on the reflectivity of the material and the color of the observation target W. Normalization is performed by dividing the numerator by the denominator, which is the sum of the luminance value i2 and the luminance value i1, to reflect the enhanced roughness component.

A coloring section 36 colorizes the roughness enhancement image by obtaining color information from a color image of the observation target W obtained by the imaging section 25. A height image generating section 35 obtains the height of the surface of the observation target W for each of the pixels of the roughness enhancement image by integrating the pixels and generates a height image in which the height is represented by the pixels. The height image generating section 35 may generate a color height image by coloring the pixels of the height image according to the height of the pixels.

As described above, in the roughness enhancement image, the color components of the image of the observation target W are removed. Lack of color components makes recognition of roughness difficult. Accordingly, the coloring section 36 performs coloring.

Figure 6A:
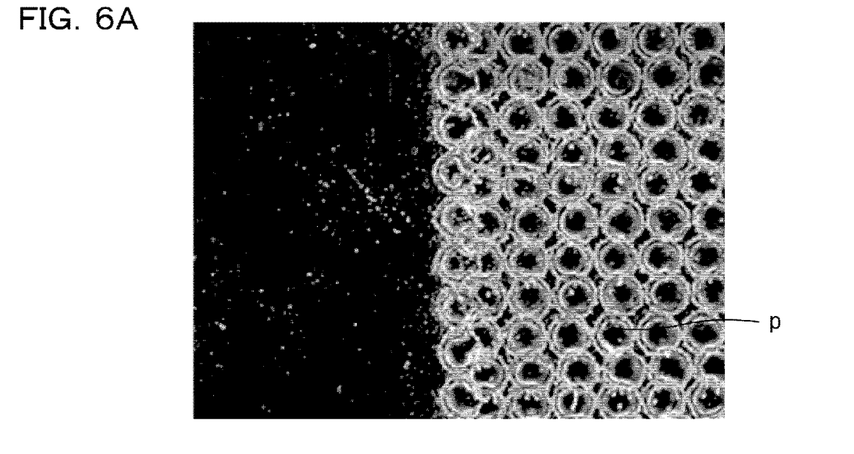
FIG. 6A illustrates a normal observation image.
Figure 6B:
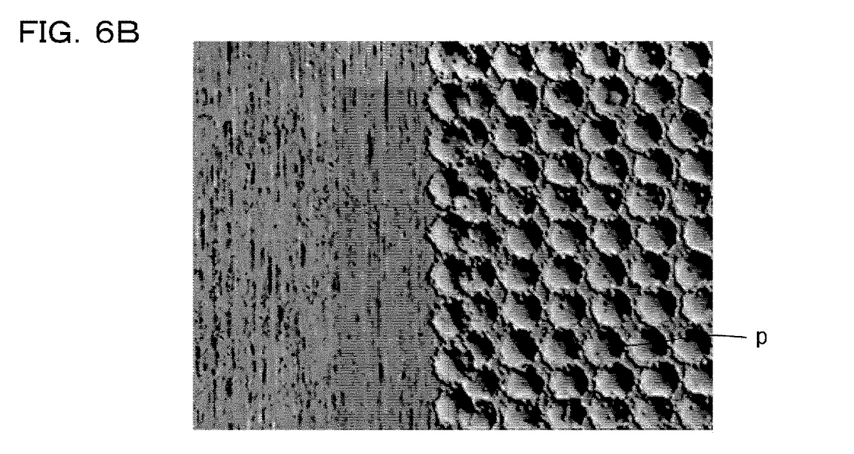
FIG. 6B illustrates a roughness enhancement image.
Figure 6C:
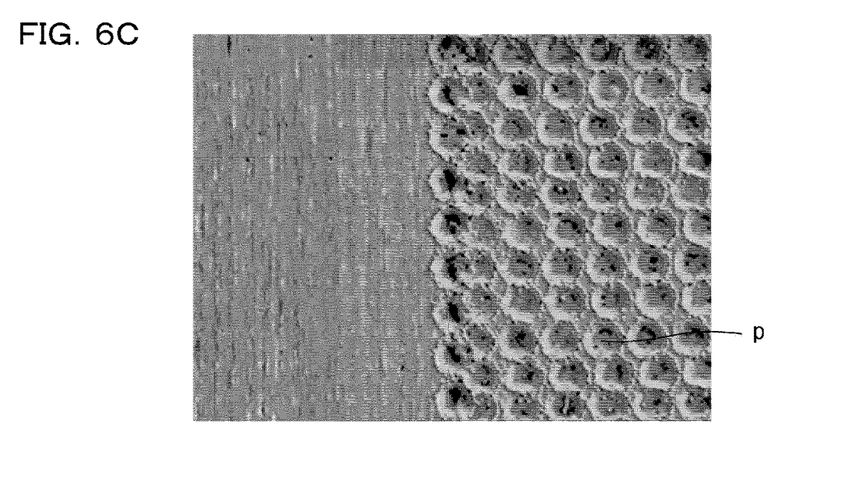
FIG. 6C illustrates a colored roughness enhancement image (photos as drawings).

FIGS. 6A to 6C illustrate the observation target marked by laser markers, which is an example of the observation target W. FIG. 6A illustrates a normal observation image. FIG. 6B illustrates a roughness enhancement image. FIG. 6C illustrates an image generated by coloring the roughness enhancement image according to the height via the height image generating section 35.

Although the state of the roughness of the observation target W cannot be grasped in FIG. 6A, the state of the roughness can be grasped in FIG. 6B. In FIG. 6B, concave portions and convex portions may be erroneously recognized due to optical illusion. Accordingly, concave portions and convex portions can be grasped accurately by performing coloring as in FIG. 6C.

The roughness enhancement image can be obtained by obtaining the illumination value that depends on the local surface inclination of the observation target W while switching the direction of illumination.

<Principle of Depth Synthesis and Roughness Enhancement>

Figure 4A:
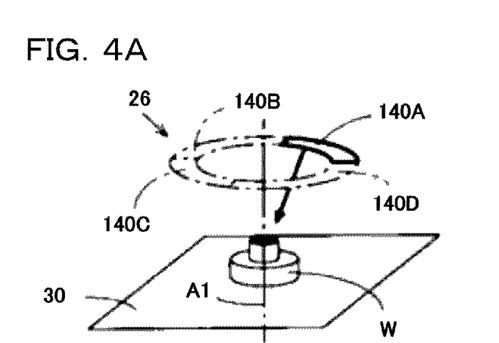
FIGS. 4A, 4B, 4C, 4D, 4E, and 4F illustrate depth synthesis and roughness enhancement.

In FIG. 4A, the observation target W is illuminated with illumination light from the first illumination direction by turning on a part of the ring illumination device 26. The ring illumination device 26 has four light source regions 140A, 140B, 140C, and 140D. That is, the ring illumination device 26 can illuminate the observation target W from four illumination directions by selectively turning on and off the four light source regions 140A, 140B, 140C, and 140D. The illumination direction of the light source region 140A is symmetric with the illumination direction of the light source region 140C about the optical axis A1. The illumination direction of the light source region 140B is symmetric with the illumination direction of the light source region 140D about the optical axis A1. In FIG. 4A, only the light source region 140A is turned on.

Figure 4B:
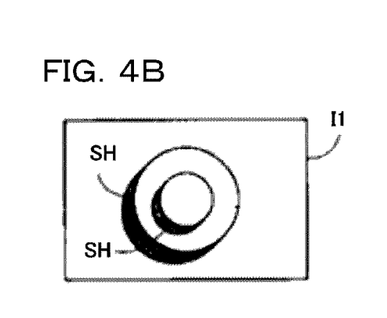

FIG. 4B illustrates a luminance image I1 obtained by illuminating the observation target W with illumination light from the first illumination direction. SH represents the shadow of the observation target W.

Figure 4C:
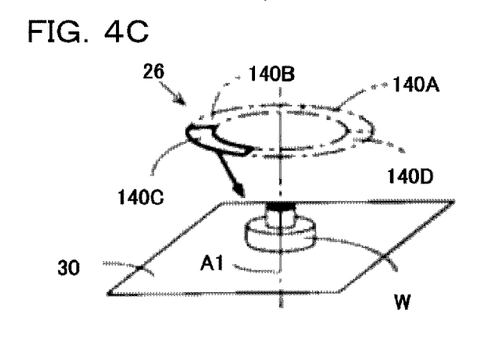
Figure 4D:
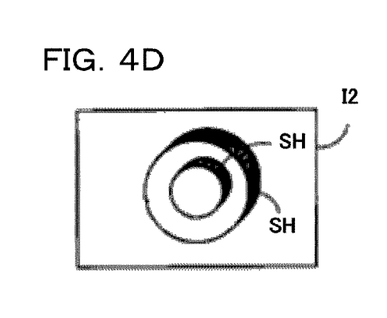

In FIG. 4C, the observation target W is illuminated with illumination light from the second illumination direction by turning on only the light source region 140C. FIG. 4C illustrates a luminance image I2 obtained by illuminating the observation target W with illumination light from the second illumination direction.

Figure 4E:
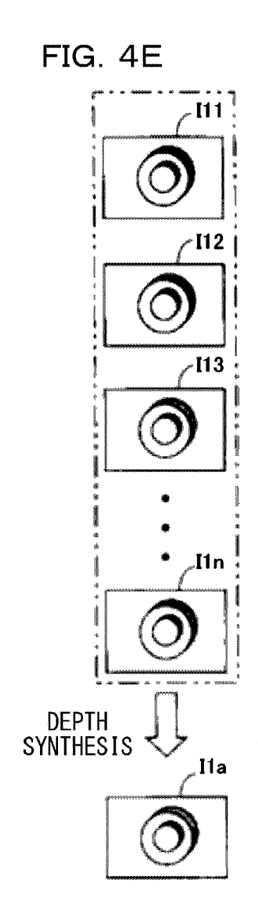

FIG. 4E illustrates n first luminance images I1l to I1n obtained by illuminating the observation target W with illumination light from the first illumination direction while changing the focal position. The depth synthesis section 33 creates a first depth combined image I1a by applying depth synthesis to then first luminance images I1l to I1n. For example, the depth synthesis section 33 analyzes a plurality of pixels present in the same pixel position in the plurality of first luminance images I1l to I1n, selects the pixel having the highest focusing degree of the plurality of pixels as the focusing pixel in the pixel position, and thereby generates the first depth combined image I1a including the focusing pixels in the plurality of pixel positions.

Figure 4F:
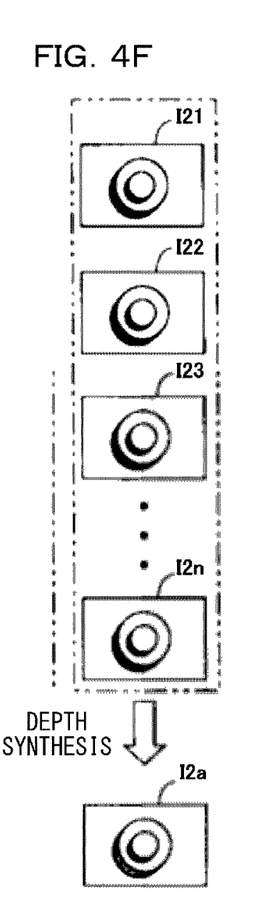

FIG. 4F illustrates n second luminance images I21 to I2n obtained by illuminating the observation target W with illumination light from the second illumination direction while changing the focal position. The depth synthesis section 33 creates a second depth combined image I2a by applying depth synthesis to the n second luminance images I21 to I2n. For example, the depth synthesis section 33 analyzes a plurality of pixels present in the same pixel position in the plurality of second luminance images I21 to I2n, selects the pixel having the highest focusing degree of the plurality of pixels as the focusing pixel in the pixel position, and thereby generates the second depth combined image I2a including the focusing pixels in the plurality of pixel positions.

The roughness enhancement section 34 generates a roughness enhancement image using the first depth combined image I1a and the second depth combined image I2a. The roughness enhancement section 34 generates a roughness enhancement image based on the difference in luminance between the first depth combined image I1a and the second depth combined image I2a.

It should be noted here that the observation target W for which a shadow SH is generated is used in FIGS. 4A to 4F.

Roughness is grasped more easily based on a roughness enhancement image in the observation target W having minute concave and convex portions as illustrated in FIGS. 6A to 6C.

Images are obtained by switching between illumination light from the first illumination direction and illumination light from the second illumination direction and a roughness enhancement image is generated by the method described above. This enhances the roughness on the surface of the observation target W.

At a point p in FIG. 6A, presence or absence of roughness cannot be grasped. However, in a roughness enhancement image as illustrated in FIG. 6B, presence or absence of roughness can be grasped at the same point p.

As described above, a roughness enhancement image can be obtained by calculation processing that enhances a small inclination of the observation target using images having different illumination directions.

<Movement of the Placement Table and Display of an Image>

The UI section 65 displays a roughness enhancement image generated by the roughness enhancement section 34 on the display section 2. The user uses the roughness enhancement image to perform the magnifying observation of a part of the observation target W. A plurality of points of the observation target W may be subjected to magnifying observation. In this case, the user moves the placement table 30 in the X-direction or the Y-direction or rotates the placement table in the θ direction by operating the console section 3. When a movement instruction for moving in the X-direction is input from the console section 3, the CPU 61 causes the placement table driving section 29 to move the placement table 30 in the X-direction. When a movement instruction for moving in the Y-direction is input from the console section 3, the CPU 61 causes the placement table driving section 29 to move the placement table 30 in the Y-direction. While such a movement instruction is input, the CPU 61 continuously moves the placement table 30 according to a movement instruction. When the user stops inputting a movement instruction, the CPU 61 stops the movement of the placement table 30 via the placement table driving section 29.

Since some processing time is necessary to generate a roughness enhancement image, the UI section 65 cannot display, on the display section 2, a roughness enhancement image generated by the roughness enhancement section 34 while the placement table 30 moves. Accordingly, while the placement table 30 moves, the UI section 65 displays the luminance image of the observation target W generated by the luminance image generating section 31 on the display section 2. Accordingly, the user checks whether the next observation portion is present within the visual field range of the imaging section 25 by checking the luminance image displayed on the display section 2. The UI section 65 displays the luminance images of the observation target W like a moving picture on the display section 2 by updating the luminance image of the observation target W at certain time intervals. When detecting that an input of a movement instruction is stopped (the placement table 30 is stopped), the CPU 61 instructs the image processor 66 to generate a roughness enhancement image. This performs the obtainment, the depth synthesis, and the roughness enhancement of luminance images described above again and displays a roughness enhancement image in a new observation position on the display section 2. Even though the user does not instruct the regeneration of a roughness enhancement image, a roughness enhancement image is regenerated as the placement table 30 is stopped. Accordingly, the user can observe a plurality of observation portions efficiently.

<Coloring of a Roughness Enhancement Image>

Pixels included in a roughness enhancement image represent roughness on the surface of the observation target W and do not include color information of the surface. Therefore, the user cannot easily grasp the relationship between the color and the roughness position of the observation portion. Accordingly, the coloring section 36 causes the imaging section 25 to image the observation target W by turning on all of the light source regions 140A to 140D of the ring illumination device 26. This causes the luminance image generating section 31 to generate a color image (luminance image) of the observation target W. The coloring section 36 obtains color information from the color image, colorizes the roughness enhancement image by mapping the color information to the roughness enhancement image, and displays the roughness enhancement image on the display section 2. This makes the user easily grasp the relationship between the color and the roughness position of the observation portion.

<HDR Process>

When the surface of the observation target W is made of metal, overexposed white pixels or underexposed black pixels may be generated on a luminance image. In such a case, roughness cannot be recognized easily on a finally generated roughness enhancement image. Accordingly, the HDR process section 32 may be adopted. The HDR process section 32 obtains a plurality of luminance sub-images having different exposure times in one focal position and generates one luminance image by applying an HDR process to the plurality of luminance sub-images. The HDR process section 32 obtains the plurality of luminance sub-images having different exposure times each time the focal position is changed and generates one luminance image by applying an HDR process to the plurality of luminance sub-images. With this, both the first luminance images I1l to I1n and the second luminance images I21 to I2n become images subjected to an HDR process. Accordingly, the depth synthesis section 33 generates the first depth image I1a by applying, to depth synthesis, the first luminance images I1l to I1n subjected to an HDR process and generates a second depth image I2a by applying, to depth synthesis, the second luminance images I21 to I2n subjected to an HDR process. In addition, the roughness enhancement section 34 generates a roughness enhancement image subjected to an HDR process by combining the first depth image I1a subjected to an HDR process and the second depth image I2a subjected to an HDR process. Accordingly, overexposed whites and underexposed blacks are not generated easily, so the user can grasp roughness on the observation target W more accurately by checking the roughness enhancement image.

<Height Image>

The roughness enhancement image described above does not include height information of the surface of the observation target W. Therefore, crater illusion occurs. Crater illusion is a phenomenon in which concave portions and convex portions are erroneously recognized by the observer because concave shapes cannot be distinguished from convex shapes based on an image. Accordingly, the height image generating section 35 may calculate the height of the surface of the observation object W for each of the pixels of the roughness enhancement image by integrating the pixels, generate a height image in which the height is represented by the pixels, and display the height image on the display unit 2. In addition, the height image generating section 35 may convert the height data of pixels of the height image to color information, map the color data to the roughness enhancement image, generate a roughness enhancement image colored differently according to the height, and display the roughness enhancement image on the display section 2. This makes the user easily distinguish concave shapes from convex shapes on the surface of the observation target W based on the color information.

<Others>

The description of the light source regions 140A and 140C provided with reference to FIGS. 4A to 4F is also applicable to the light source regions 140B and 140D. That is, the image processor 66 may generate a roughness enhancement image using the pair of light source regions 140A and 140C or may generate a roughness enhancement image using the pair of light source regions 140B and 140D. The illumination direction of the light source region 140B may be referred to as a third illumination direction. The illumination direction of the light source region 140D may be referred to as a fourth illumination direction. The third illumination direction is symmetric (line-symmetric) with the fourth illumination direction about the optical axis A1.

The luminance image generating section 31 illuminates the observation target W illumination light from the third illumination direction, which is different from the first illumination direction and the second illumination direction, by controlling the ring illumination device 26. The luminance image generating section 31 obtains the plurality of third luminance images by controlling the Z-direction driving section 28 and the imaging section 25 so as to image the observation target W in a plurality of different focal positions. Similarly, the luminance image generating section 31 illuminates the observation target W with illumination light from the fourth illumination direction by controlling the ring illumination device 26. The luminance image generating section 31 obtains the plurality of fourth luminance images by controlling the Z-direction driving section 28 and the imaging section 25 so as to image the observation target W in a plurality of different focal positions. The image processor 66 generates the roughness enhancement image corresponding to the illumination direction selected by the UI section 65 from the first illumination direction, the second illumination direction, the third illumination direction, and the fourth illumination direction, using the plurality of luminance images corresponding to the selected illumination direction among the plurality of first illumination images, the plurality of second illumination images, the plurality of third illumination images, and the plurality of fourth illumination images. The display section 2 displays the roughness enhancement image corresponding to the selected illumination direction. Although the first illumination direction is selected in the above embodiment, the second illumination direction may be selected. In this case, i1 is exchanged with i2 in expression (1). When the third illumination direction is selected, the luminance value of the pixels of the third luminance image is i1 and the luminance value of the pixels of the fourth luminance image is i2 in expression (1). When the fourth illumination direction is selected, the luminance value of the pixels of the fourth luminance image is i1 and the luminance value of the pixels of the third luminance image is i2 in expression (1).

<Modifications>

In the above embodiment, depth synthesis is executed and then roughness enhancement is executed. However, roughness enhancement may be executed before depth synthesis is executed.

The roughness enhancement section 34 generates a roughness enhancement sub-image I1x using the first luminance image I1l and the second luminance image 121. Similarly, the roughness enhancement section 34 generates a roughness enhancement sub-image I2x using a first luminance image 112 and a second luminance image 122. The roughness enhancement section 34 repeats this process in the same manner and finally generates a roughness enhancement sub-image Ixn using the first luminance image I1n and the second luminance image I2n. With this, the depth synthesis section 33 applies depth synthesis to n roughness enhancement sub-images Ix' to Ixn, generates a final roughness enhancement image, and displays the roughness enhancement image on the display section 2.

It should be noted here that the ring illumination device 26 may be disposed around the objective lens 23 or may be configured to illuminate the observation target W with illumination light via the objective lens 23. Other than this, the layout disclosed in US2018/024346 described by the same applicant as this specification may be used as the layout of the ring illumination device 26. The entire contents of the disclosure are incorporated herein by reference as a part of this specification.

Even when inclined observation is performed while the head section 22 of the observation section 1 swings with respect to the placement table 30, a roughness enhancement image can be generated as in the case in which the head section 22 is orthogonal to the placement table 30. As described above, the roughness enhancement image may be further subjected to depth synthesis. At this time, the driving of the head section 22 and the placement table 30 may be controlled so that the upper surface of a workpiece W coincides with an eucentric position. The control in this case is also disclosed in Japanese Patent Application No. 2018-161347 and the entire contents of the disclosure are incorporated herein by reference as a part of this specification.

<Flowchart>

Figure 5:
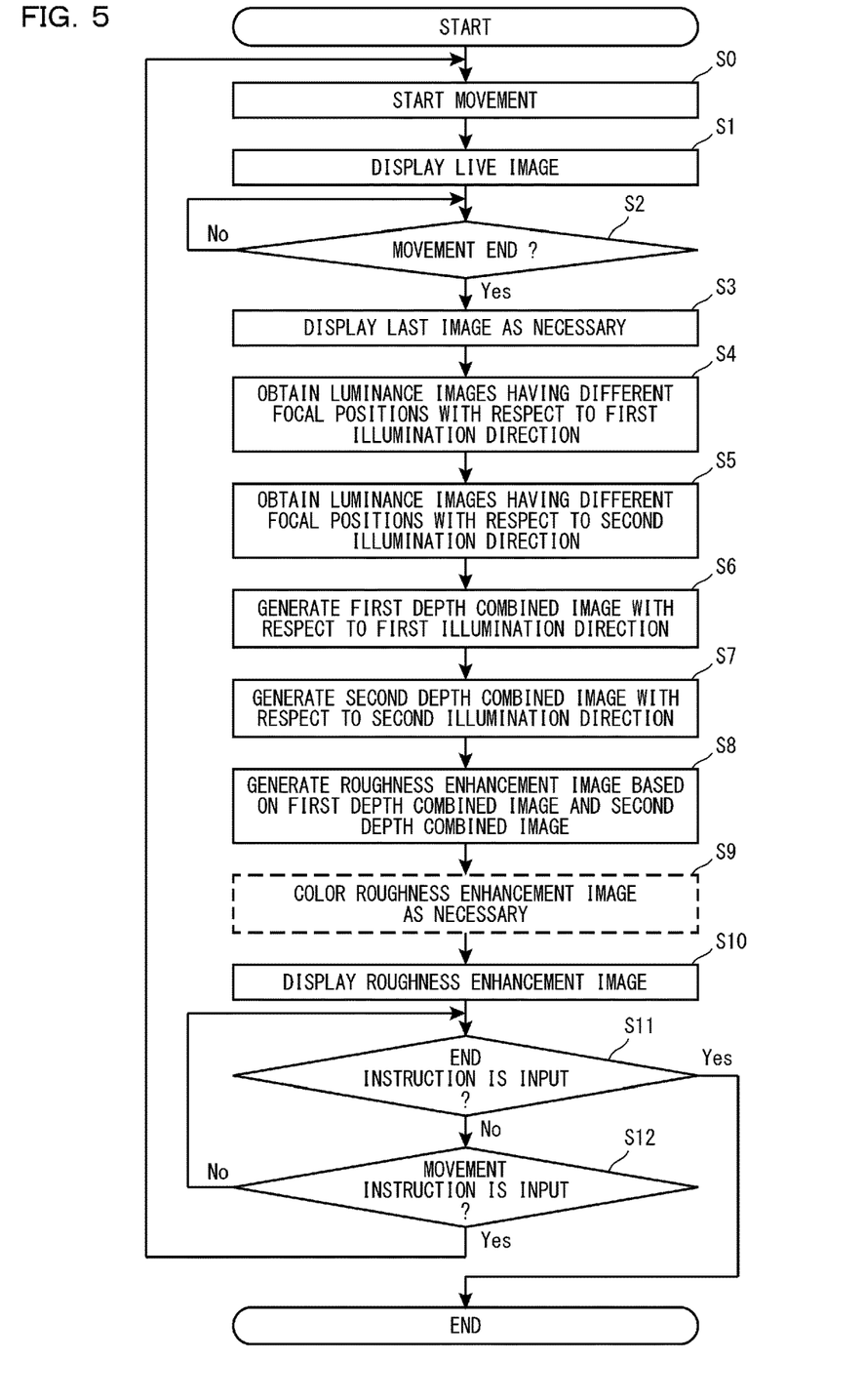
FIG. 5 is a flowchart illustrating a magnification observation process.

FIG. 5 is a flowchart illustrating a magnification observation process. When the mouse 4 or the console section 3 instructs the start of this process, the CPU 61 performs the following process.

The magnification observation process when a roughness enhancement image is displayed in an image display region 2a will be described.

At S0, the CPU 61 moves the placement table 30 by controlling the placement table driving section 29 according to a movement instruction input through the mouse 4, the console section 3, or the like.

When the start of movement is detected at S1, a live image is displayed in the image display region 2a. That is, the CPU 61 controls the imaging section 25 and the ring illumination device 26 via the imaging control section 62 and the illumination control section 64 so as to image the observation target W, controls the image processor 66 so as to generate a live image (luminance image updated at certain time intervals) of the observation target W, and displays the live image on the display section 2 via the display control section 63. The illumination control section 64 turns on all of the four light source regions 140A to 140D for the live image. The user moves the placement table 30 in the X-direction, the Y-direction, the Z-direction, and the θ-direction so that the observation target W enters the visual field range of the imaging section 25 while seeing the live image.

At S2, the CPU 61 decides whether the movement of the placement table 30 is completed. The CPU 61 decides that the movement of the placement table 30 is completed, for example, when an explicit movement instruction is input or a certain time passes after a movement instruction is input through the mouse 4 or the console section 3. The CPU 61 proceeds to S3 when deciding that the movement of the placement table 30 is completed.

At S3, the CPU 61 displays the live image when the movement is completed in the image display region 2a. If an image of the observation target W is not displayed in the display region in the period from S4 to S10, the user cannot easily grasp observation target W. Accordingly, the CPU 61 may display an image of the observation target W immediately before generating the roughness enhancement image in the image display region 2a as necessary while generating the roughness enhancement image.

At S4, the CPU 61 generates the plurality of first luminance images I1l to I1n having different focal positions with respect to the first illumination direction. The illumination control section 64 turns on one light source region corresponding to the first illumination direction among the light source regions 140A to 140D. The imaging control section 62 causes the imaging section 25 and the luminance image generating section 31 to obtain the first luminance images I1l to I1n while changing the focal position of the objective lens 23 little by little through the Z-direction driving section 28.

At S5, the CPU 61 generates the plurality of second luminance images I21 to I2n having different focal positions with respect to the second illumination direction. The illumination control section 64 turns on one light source region corresponding to the second illumination direction among the light source regions 140A to 140D. The imaging control section 62 causes the imaging section 25 and the luminance image generating section 31 to obtain the second luminance images I21 to I2n while changing the focal position of the objective lens 23 little by little through the Z-direction driving section 28.

At S6, the CPU 61 generates the first depth image I1a with respect to the first illumination direction by applying depth synthesis to the first luminance images I1l to I1n using the depth synthesis section 33.

At S7, the CPU 61 generates the second depth image I2a with respect to the second illumination direction by applying depth synthesis to the second luminance images I21 to I2n using the depth synthesis section 33.

At S8, the CPU 61 generates a roughness enhancement image based on the first depth image I1a and the second depth image I2a using the roughness enhancement section 34.

At S9, the CPU 61 colors the roughness enhancement image using the coloring section 36 or the height image generating section 35. This gives the color of the surface of the observation target W to the roughness enhancement image or colors the roughness enhancement image according to the height data obtained from a height image.

At S10, the CPU 61 displays the roughness enhancement image on the display section 2 through the UI section 65 and the display control section 63. That is, the roughness enhancement image is displayed instead of the live image of the observation target W.

At S11, the CPU 61 decides whether an end instruction of the magnification observation process has been input. When the end instruction has been input through the mouse 4 or the like, the CPU 61 ends the magnification observation process. When the end instruction has not been input, the CPU 61 proceeds to S12.

At S12, the CPU 61 decides whether a movement instruction of the placement table 30 has been input through the mouse 4 or the like. When the movement instruction has not been input, the CPU 61 returns to S11. When the movement instruction has been input, the CPU 61 returns to S1 and displays the live image of the observation target W on the display section 2. After that, when the movement of the placement table 30 is stopped, the CPU 61 performs the generation of the roughness enhancement image again.

<Summary>

As described in FIG. 1 and the like, the head section 22 functions as an optical system including the objective lens and the imaging lens. The ring illumination device 26 functions as an illumination section that illuminates the observation target W placed in the visual field of the optical system with illumination light from different directions. The imaging section 25 receives light from the observation target W via the optical system and generates a luminance image of the observation target W. The Z-direction driving section 28 functions as a change section that changes the focal position of the optical system along the optical axis A1 of the optical system. The control section 60 functions as a control section that controls the illumination section, the imaging section, and the change section. The display section 2 functions as a display section that displays an observation image that is an image of the observation target W. The image processor 66 functions as an image generating section that (i) obtains the plurality of first luminance images by controlling the illumination section so as to illuminate the observation target with illumination light from the first illumination direction and controlling the change section and the imaging section so as to image the observation target in a plurality of different focal positions, (ii) obtains the plurality of second luminance images by controlling the illumination section so as to illuminate the observation target with illumination light from the second illumination direction symmetric with the first illumination direction about the optical axis and controlling the change section and the imaging section so as to image the observation target in a plurality of different focal positions, and (iii) generates a roughness enhancement image that enhances the roughness on the surface of the observation target by applying depth synthesis and roughness enhancement to the plurality of first luminance images and the plurality of second luminance images and has a depth of field wider than a single luminance image obtainable by the imaging section. The display section 2 displays a roughness enhancement image as an observation image. This provides a roughness enhancement image produced through depth synthesis.

The depth synthesis section 33 functions as a depth synthesis section that generates the first depth combined image by applying depth synthesis to the plurality of first luminance images and generates the second depth combined image by applying depth synthesis to the plurality of second luminance images. The roughness enhancement section 34 functions as an enhancement image generating section that generates a roughness enhancement image based on the difference in luminance between the first depth combined image and the second depth combined image.

The depth synthesis section 33 may analyze a plurality of pixels present in the same pixel position in the plurality of first luminance images, select the pixel having the highest focusing degree of the plurality of pixels as the focusing pixel in the pixel position, and thereby generate the first depth combined image including the focusing pixels in the plurality of pixel positions. It should be noted here that the focusing degree may be calculated for each pixel region including a plurality of adjacent pixels. The depth synthesis section 33 may analyze a plurality of pixels present in the same pixel position in the plurality of second luminance images, select the pixel having the highest focusing degree of the plurality of pixels as the focusing pixel in the pixel position, and thereby generate the second depth combined image including the focusing pixels in the plurality of pixel positions.

The placement table 30 is an example of an XY stage movable at least in the X-direction and the Y-direction on which the observation target W is placed. The placement table driving section 29 is an example of a driving section that drives the XY stage. As described in relation to S12, the CPU 61 may also function as a detection section that detects that the XY stage has stopped after moving. When the detection section detects that the XY stage has stepped after moving, the CPU 61 and the image processor 66 may perform the generation of the roughness enhancement image again. This enables the user to omit the need to explicitly instruct the generation of a roughness enhancement image.

It should be noted here that the detection section may make a decision based on an image of the observation target W. The detection section may decide that the XY stage has stopped when the difference between the previous time and the current time is none or small.

When the CPU 61 detects that the XY stage is moving, the CPU 61 may display a moving image (live image) obtained by the imaging section 25 on the display section 2. When detecting that the XY stage has stopped, the CPU 61 may cause the image processor 66 to perform the generation of the roughness enhancement image again and the display section 2 to display the roughness enhancement image.

The coloring section 36 may function as a color synthesis section that obtains color information from a color image of the observation target W obtained by the imaging section 25 and colorizes the roughness enhancement image. This makes the user easily understand the relationship between roughness and surface color.

When generating the first luminance image, the image processor 66 may obtain a plurality of luminance sub-images having different exposure times, apply an HDR process to the plurality of luminance sub-images, and thereby generate the first luminance image. Similarly, when generating the second luminance image, the image processor 66 may obtain a plurality of luminance sub-images having different exposure times, apply an HDR process to the plurality of luminance sub-images, and thereby generate the second luminance image. By applying an HDR process in this way, it is possible to obtain a roughness enhancement image produced through depth synthesis in which overexposed white portions and underexposed black portions are reduced.

The height image generating section 35 may calculate the height of the surface of the observation target for each of pixels of the roughness enhancement image by integrating the pixels and generate a height image in which the height is represented by the pixels. In addition, the height image generating section 35 may generate a color height image by coloring the pixels in the height image according to the height represented by the pixels. This makes crater illusion less likely to occur and the user can distinguish concave shapes from convex shapes more accurately.

The mouse 4, the console section 3, and the CPU 61 may function as a selection section that selects the illumination direction of the illumination section. The image processor 66 may control the illumination section so as to illuminate the observation target W with illumination light from the third illumination direction different from the first illumination direction and the second illumination direction and may control the change section and the imaging section so as to image the observation target in a plurality of different focal positions, and thereby obtain the plurality of third luminance images. The image processor 66 may control the illumination section so as to illuminate the observation target with illumination light from the fourth illumination direction symmetric with the third illumination direction about the optical axis, control the change section and the imaging section to image the observation target in a plurality of different focal positions, and thereby obtain the plurality of fourth luminance images. In addition, the image processor 66 may generate the roughness enhancement image corresponding to the illumination direction selected by the selection section from the first illumination direction, the second illumination direction, the third illumination direction, and the fourth illumination direction using a plurality of luminance images corresponding to the illumination direction selected by the selection section from the plurality of first luminance images, the plurality of second luminance images, the plurality of third luminance images, and the plurality of fourth luminance images. The display section 2 may display the roughness enhancement image corresponding to the illumination direction selected by the selection section.

The roughness enhancement section 34 may synthesize a pair of luminance images having the same focal position from the plurality of first luminance images and the plurality of second luminance images based on the difference in luminance and generate a plurality of roughness enhancement sub-images in which roughness is enhanced in each of a plurality of focal positions. The depth synthesis section 33 may function as a depth combined image generating section that generates a roughness enhancement image subjected to depth synthesis by applying depth synthesis to the plurality of roughness enhancement sub-images. As described above, roughness enhancement or depth synthesis may be performed first.

The illumination section may be the ring illumination device 26 disposed around the objective lens 23. The illumination section may be an illumination light source which is provided in the head section 22 and illuminates the observation target W with illumination light through the objective lens 23.

What is claimed is:

1. A magnifying observation apparatus comprising:
    an optical system that includes an objective lens and an imaging lens;
    an illumination section that illuminates, from different directions, an observation target placed in a visual field of the optical system with illumination light;
    an imaging section that receives light from the observation target via the optical system and generates a luminance image of the observation target;
    a change section that changes a focal position of the optical system along an optical axis of the optical system;
    a control section that controls the illumination section, the imaging section, and the change section; and
    a display section that displays an observation image that is an image of the observation target,
    wherein the control section has an image generating section that obtains a plurality of first luminance images by controlling the illumination section so as to illuminate the observation target with the illumination light from a first illumination direction and controlling the change section and the imaging section so as to image the observation target in a plurality of different focal positions,
    obtains a plurality of second luminance images by controlling the illumination section so as to illuminate the observation target with the illumination light from a second illumination direction symmetric with the first illumination direction about the optical axis and controlling the change section and the imaging section so as to image the observation target in a plurality of different focal positions, and
    generates a roughness enhancement image that enhances roughness on a surface of the observation target by applying depth synthesis and roughness enhancement to the plurality of first luminance images and the plurality of second luminance images and has a depth of field wider than a single luminance image obtainable by the imaging section and wherein the display section displays the roughness enhancement image as the observation image.

2. The magnifying observation apparatus according to claim 1, wherein the image generating section has a depth synthesis section that generates a first depth combined image by applying depth synthesis to the plurality of first luminance images and generates a second depth combined image by applying depth synthesis to the plurality of second luminance images and an enhancement image generating section that generates the roughness enhancement image based on a difference in luminance between the first depth combined image and the second depth combined image.

3. The magnifying observation apparatus according to claim 2, wherein the depth synthesis section analyzes a plurality of pixels in the same pixel position in the plurality of first luminance images, selects a pixel having the highest focusing degree from the plurality of pixels as a focusing pixel in the pixel position, and thereby generates the first depth combined image including focusing pixels in a plurality of pixel positions and analyzes a plurality of pixels in the same pixel position in the plurality of second luminance images, selects a pixel having the highest focusing degree from the plurality of pixels as a focusing pixel in the pixel position, and thereby generates the second depth combined image including focusing pixels in a plurality of pixel positions.

4. The magnifying observation apparatus according to claim 2, further comprising:

a color synthesis section that obtains color information from a color image of the observation target obtained by the imaging section and colorizes the roughness enhancement image.

5. The magnifying observation apparatus according to claim 1, wherein the image generating section has an enhancement image generating section that synthesizes pairs of luminance images having the same focal position of the plurality of first luminance images and the plurality of second luminance images based on a difference in luminance and generates a plurality of roughness enhancement sub-images having enhanced roughness in the plurality of focal positions and a depth combined image generating section that generates the roughness enhancement image by applying depth synthesis to the plurality of roughness enhancement sub-images.

6. The magnifying observation apparatus according to claim 1, further comprising:

an XY stage on which the observation target is placed, the XY stage being movable in at least an X-direction and a Y-direction;

a driving section that drives the XY stage; and a detection section that detects about motion of the XY stage, wherein the image generating section performs generation of the roughness enhancement image when the detection section detects that the XY stage stops.

7. The magnifying observation apparatus according to claim 6, wherein the display section displays a moving image obtained by the imaging section when the detection section detects that the XY stage is moving, the image generating section performs generation of the roughness enhancement image when the detection section detects that the XY stage stops, and the display section displays the roughness enhancement image.

8. The magnifying observation apparatus according to claim 1, further comprising:

a color synthesis section that obtains color information from a color image of the observation target obtained by the imaging section and colorizes the roughness enhancement image.

9. The magnifying observation apparatus according to claim 1, wherein the image generating section generates the first luminance images by obtaining a plurality of luminance sub-images having different exposure times and applying an HDR process to the luminance sub-images and, generates the second luminance images by obtaining a plurality of luminance sub-images having different exposure times and applying an HDR process to the luminance sub-images.

10. The magnifying observation apparatus according to claim 1, further comprising:

a height image generating section that calculates a height of the surface of the observation target for each of pixels of the roughness enhancement image by integrating the pixels and generates a height image in which the height is represented by the pixels.

11. The magnifying observation apparatus according to claim 10, wherein the height image generating section generates a color height image by coloring the pixels of the height image according to the height represented by the pixels.

12. The magnifying observation apparatus according to claim 1, further comprising:

a selection section that selects an illumination direction of the illumination section, wherein the image generating section obtains a plurality of third luminance images by controlling the illumination section so as to illuminate the observation target with the illumination light from a third illumination direction that is different from the first illumination direction and the second illumination direction and controlling the change section and the imaging section so as to image the observation target in a plurality of different focal positions, and obtains a plurality of fourth luminance images by controlling the illumination section so as to illuminate the observation target with the illumination light from a fourth illumination direction symmetric with the third illumination direction about the optical axis and controlling the change section and the imaging section so as to image the observation target in a plurality of different focal positions, wherein the image generating section further generates the roughness enhancement image corresponding to an illumination direction selected by the selection section from the first illumination direction, the second illumination direction, the third illumination direction, and the fourth illumination direction, using a plurality of luminance images corresponding to the illumination direction selected by the selection section from the plurality of first luminance images, the plurality of second luminance images, the plurality of third luminance images, and the plurality of fourth luminance images, and wherein the display section displays the roughness enhancement image corresponding to the illumination direction selected by the selection section.

13. The magnifying observation apparatus according to claim 1, wherein the illumination section is a ring illumination device disposed around the objective lens.

14. The magnifying observation apparatus according to claim 1, wherein the illumination section illuminates the observation target with the illumination light through the objective lens.

15. The magnifying observation apparatus according to claim 1, wherein the roughness enhancement image is obtained by dividing the difference between a pair of pixel value of the first luminance image and the second luminance image by the sum of the pair of pixel values.

16. The magnifying observation apparatus according to claim 1, wherein the roughness enhancement image is obtained by normalizing a difference between a pair of pixel value of the first luminance image and the second luminance image.

17. The magnifying observation apparatus according to claim 1, wherein the roughness enhancement image is reflecting an inclination of a local position of the observation target.

18. The magnifying observation apparatus according to claim 1, further comprising:

an XY stage on which the observation target is placed, the XY stage being movable in at least an X-direction and a Y-direction;

wherein the roughness enhancement image is displayed on the display section when the XY stage is not moving.

19. The magnifying observation apparatus according to claim 1, further comprising:

an XY stage on which the observation target is placed, the XY stage being movable in at least an X-direction and a Y-direction;

wherein a moving image obtained by the imaging section is displayed on the display section when the XY stage is moving.

20. The magnifying observation apparatus according to claim 1, further comprising:

an XY stage on which the observation target is placed, the XY stage being movable in at least an X-direction and a Y-direction;

wherein the roughness enhancement image is displayed on the display section when the XY stage is not moving, and a moving image obtained by the imaging section is displayed instead of the roughness enhancement image on the display section when the XY stage is moving.

* * * * *